(12) United States Patent
Guerrero

(10) Patent No.: US 7,717,097 B2
(45) Date of Patent: May 18, 2010

(54) METHOD FOR CONTROLLING THE TEMPERATURE OF GASES ENTERING AN ENGINE OF AN AUTOMOTIVE VEHICLE, HEAT EXCHANGER AND DEVICE FOR MANAGING THE TEMPERATURE OF THESE GASES

(75) Inventor: Pascal Guerrero, Rueil Malmaison (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 11/450,519

(22) Filed: Jun. 9, 2006

(65) Prior Publication Data

US 2006/0236987 A1      Oct. 26, 2006

Related U.S. Application Data

(63) Continuation of application No. 10/500,939, filed on Jul. 8, 2004, now abandoned.

(51) Int. Cl.
*F02M 31/04*         (2006.01)

(52) U.S. Cl. .................. 123/542; 123/553; 123/556; 123/564; 123/568.11

(58) Field of Classification Search ......... 123/572–574, 123/41.86, 542, 556, 568.11–568.32, 553, 123/563
See application file for complete search history.

(56) References Cited

U.S. PATENT DOCUMENTS

| | | | | | |
|---|---|---|---|---|---|
| 3,441,011 | A | * | 4/1969 | Karl | 123/542 |
| 3,577,961 | A | * | 5/1971 | Deutschmann et al. | 123/542 |
| 4,539,815 | A | * | 9/1985 | Garcea | 60/599 |
| 5,385,132 | A | * | 1/1995 | Lehman | 123/542 |
| 5,740,786 | A | * | 4/1998 | Gartner | 123/568.12 |
| 6,279,556 | B1 | * | 8/2001 | Busen et al. | 123/572 |
| 6,408,831 | B1 | * | 6/2002 | Craig et al. | 123/542 |
| 6,422,224 | B1 | | 7/2002 | Walker, Jr. | |
| 6,626,163 | B1 | * | 9/2003 | Busen et al. | 123/572 |
| 6,684,864 | B1 | | 2/2004 | Busen et al. | |
| 6,942,709 | B2 | | 9/2005 | Trautmann et al. | |
| 2002/0100465 | A1 | * | 8/2002 | Pietschner | 123/572 |
| 2003/0024512 | A1 | | 2/2003 | Kitano et al. | |

FOREIGN PATENT DOCUMENTS

| | | | |
|---|---|---|---|
| DE | 199 246 77 | A * | 8/2000 |
| DE | 199 18 311 | A1 | 11/2000 |

(Continued)

OTHER PUBLICATIONS

International Search Report dated Sep. 24, 2004, based on International Application No. PCT/EP2004/050972.

(Continued)

*Primary Examiner*—M. McMahon

(57) ABSTRACT

According to the method, the gases are circulated in a liquid/gas heat exchanger (2, 12) prior to their entering the internal combustion engine (58) and a high temperature liquid and/or a low temperature liquid is circulated in the liquid/gas heat exchanger (2, 12) in order to heat and/or cool the gases (84) as required. The liquid/gas heat exchanger may comprise a single stage or two stages, that is a high temperature stage and a low temperature stage. It can also be used to cool the recirculating exhaust gases prior to their entering the engine.

3 Claims, 4 Drawing Sheets

FOREIGN PATENT DOCUMENTS

| | | |
|---|---|---|
| DE | 100 44 922 A1 | 4/2002 |
| DE | 102 05 981 A1 | 8/2003 |
| EP | 1170498 | 1/2002 |
| GB | 1 255 642 | 12/1971 |
| JP | 2002-021653 A | 1/2002 |
| WO | WO 00/65206 | 11/2000 |

OTHER PUBLICATIONS

English language translation and abstract for JP 2002-021653 extracted from PAJ database, dated Mar. 9, 2009, 37 pages.

"UltimateCooling (TM) New Cooling System Concept Using the Same Coolant to Cool All Vehicle Fluids", Ngy-Srun AP, et al. VTMS 6/ IMechE 2003 L07/C599-10, 14 pages, Valeo Engine Cooling (Attachment "C").

UltimateCooling (TM) System for New Generation of Vehicle, Ngy-Srun AP, et al., Copyright 2004 SAE International, Paper 05VTMS-71, 10 pages, Valeo Engine Cooling (Attachment "D").

* cited by examiner

METHOD FOR CONTROLLING THE TEMPERATURE OF GASES ENTERING AN ENGINE OF AN AUTOMOTIVE VEHICLE, HEAT EXCHANGER AND DEVICE FOR MANAGING THE TEMPERATURE OF THESE GASES

This application is a continuation of patent application Ser. No. 10/500,939 filed Jul. 8, 2004 now abandoned.

The invention relates to a method for controlling the temperature of gases entering an internal combustion engine and particularly an engine of an automotive vehicle.

It also relates to a liquid/gas heat exchanger for use in this method.

The engines of modern automotive vehicles have increasingly high specific capacities. Large quantities of air are sent into the engine's combustion chambers, in order to also inject more fuel therein. This is why the intake air entering the engine is compressed. However, the compression levels reached today are increasingly high, so that this compression causes substantial heating of the air. This air must therefore be cooled prior to entering the engine. This is why a supercharging air cooler is provided, usually an ambient air/supercharging air heat exchanger. The increase in the compression ratios of the intake air entails increasing the size of the supercharging air cooler, and therefore its overall dimensions. It is consequently becoming increasingly difficult to house it in the front part of the vehicle.

Also known are supercharging air coolers cooled by the engine cooling fluid, generally water. The use of engine cooling water to cool the supercharging air releases space in the front part of the vehicle and penalizes the engine cooling less in terms of air speed and temperature, and the air-conditioning condenser less in terms of air speed. However, the exclusive function of these known heat exchangers is to cool the supercharging air.

Moreover, independently of the increase in engine specific capacity, environmental standards require a drastic reduction in the emission levels of solid and gaseous pollutants. This is why catalytic converters are used and, on diesel engines, particulate filters. The catalytic converters and the catalyst of the particulate filters must be primed as rapidly as possible on starting the engine. This makes it necessary to heat the air entering the engine in its starting phase. To do this, a specific heat exchanger is used to heat the intake air by heat exchange with the engine cooling water. This heat exchanger is also activated during the regeneration phase of the particulate filter in diesel engines.

Furthermore, to reduce the formation of nitrogen oxides at low and partial engine load, a portion of the exhaust gases is recirculated from the exhaust to the intake in order to lower the combustion temperature and decrease the formation of nitrogen oxides. To improve the cooling of these gases, a heat exchanger has been introduced between the exhaust gases, of which the temperature can reach about 500° C., and the engine cooling water, of which the temperature is about 100° C. A heat exchanger of this type is mounted on many diesel vehicles.

Thus, the need to heat or cool the gases entering the engine combustion chambers demands the presence of three distinct heat exchangers: a heat exchanger to cool the supercharging air, a heat exchanger to heat the gases entering the engine during its starting period, and a cooler for the recycled exhaust gases.

These three heat exchangers are costly to manufacture. They also occupy a large volume of the engine compartment.

The present invention relates to a method for controlling the temperature of the gases entering an automotive vehicle engine, which corrects these drawbacks. This method serves to reduce the number of heat exchangers and, consequently, to reduce their cost and their overall dimensions.

This result is achieved according to the invention by the fact that the gases entering the engine are circulated in a liquid/gas heat exchanger prior to entering the internal combustion engine, and by the fact that a high temperature liquid and/or a low temperature liquid is circulated in the liquid/gas heat exchanger in order to heat and/or cool the gases as required.

The invention further relates to a liquid/gas heat exchanger for use in the method of the invention.

In a variant, the heat exchanger is a single-stage heat exchanger and valve means are provided to circulate either a low temperature liquid, or a high temperature liquid, or a mixture of both liquids, in the heat exchanger.

In a preferred variant, this liquid/gas heat exchanger comprises a section through which the engine intake air passes and a section through which a recirculated fraction of the exhaust gases passes.

According to another embodiment, the liquid/gas heat exchanger comprises a high temperature stage in which a high temperature liquid can be circulated, and a low temperature stage in which a low temperature liquid can be circulated, and interconnecting means for controlling the circulation of the high temperature and low temperature liquids as required.

In a particular variant of this embodiment, the high temperature stage of this exchanger comprises a section through which the engine intake air passes and a section through which a recirculated fraction of the exhaust gases passes.

The low temperature stage of this heat exchanger can also comprise a section through which the engine intake air passes and a section through which a recirculated fraction of the exhaust gases passes.

In the multistage variants discussed above, the engine intake air is advantageously circulated in series through the stages. The heat exchanger according to the invention is accordingly able to allow a circulation of the engine intake air in such an operating mode.

Whether in connection with a multistage or single-stage heat exchanger, the hot or cold liquid is advantageously circulated in series at the level of the section or sections through which the engine intake air passes and at the level of the section or sections through which a recirculated fraction of the exhaust gases passes. The heat exchanger according to the invention is accordingly able to allow a circulation of the liquid in such an operating mode.

Moreover, the invention relates to a device for managing the temperature of the gases entering a heat engine, particularly of an automotive vehicle, comprising a main loop equipped with a main pump for circulating a heat transfer fluid between the heat engine and a main high temperature cooling radiator. A secondary loop includes a secondary low temperature radiator, the system further comprising a liquid/gas radiator according to the invention and interconnecting means for circulating the heat transfer fluid in the liquid/gas heat exchanger as required to heat and/or cool the gases entering the engine.

The management device comprises a single-stage heat exchanger and a three-way valve for circulating either the hot heat transfer fluid directly leaving the internal combustion engine in the heat exchanger, or a cold heat transfer fluid leaving the low temperature radiator, or an adequate mixture of both fluids.

The management device comprises a single-stage heat exchanger and a branch on the high temperature fluid circuit equipped with an additional circulating pump, a valve for circulating either the hot heat transfer fluid directly leaving the heat engine, or the cold heat transfer fluid cooled in the low temperature radiator, or an adequate mixture of both fluids.

The management device comprises a two-stage heat exchanger, a three-way valve for circulating the hot heat transfer fluid leaving the internal combustion engine in the high temperature stage, and a cold heat transfer fluid cooled in the low temperature radiator in the low temperature stage of the heat exchanger, or an adequate mixture of both fluids in the appropriate stage.

The management device comprises a two-stage heat exchanger, a two-way valve for circulating the hot heat transfer fluid directly leaving the internal combustion engine in the high temperature stage of the heat exchanger, an additional loop equipped with a circulating pump for circulating the cold heat transfer fluid cooled in the low temperature radiator in the low temperature stage of the heat exchanger.

Other features and advantages of the present invention will appear further from a reading of the description below of embodiments provided for illustration with reference to the figures appended hereto. In these figures.

Figure 1:
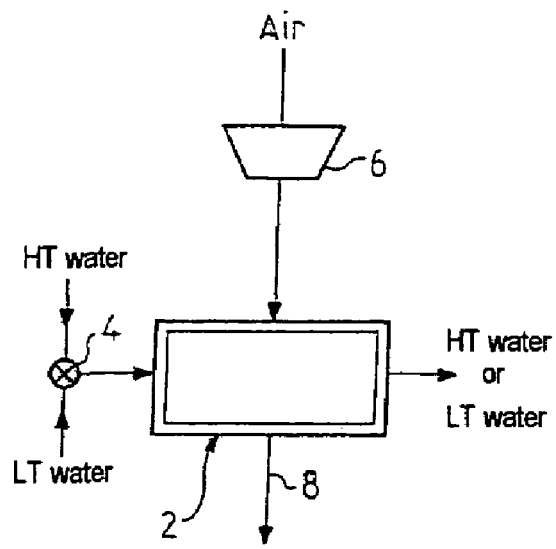
FIG. 1 is a schematic view of a single-stage liquid/gas heat exchanger according to the present invention.

In FIG. 1, the liquid/gas heat exchanger designated by the general reference numeral 2 comprises a single stage. This heat exchanger allows an exchange of heat between a liquid and a gas. The gas consists of the intake air of the heat engine. The liquid consists of cooling water for the engine of the automotive vehicle. High temperature (HT) water or low temperature (LT) water, or a mixture of the two fluids, can be circulated in the heat exchanger 2, according to the position of three-way valve 4. When the low temperature water circulates through the heat exchanger 2, the heat exchanger acts as a supercharging air cooler. The intake air compressed and heated in the compressor 6 is cooled by passing through the heat exchanger before being sent to the engine intake chambers, as shown by the arrow 8. On the contrary, in order to heat the air entering the engine, for example in the vehicle starting phase or in the particulate filter regeneration phase, high temperature water is circulated in the radiator, thereby heating the air entering the engine. The low temperature water comes, for example, from a low temperature radiator. The high temperature water comes from a branch connection at the outlet of the heat engine.

Figure 2:
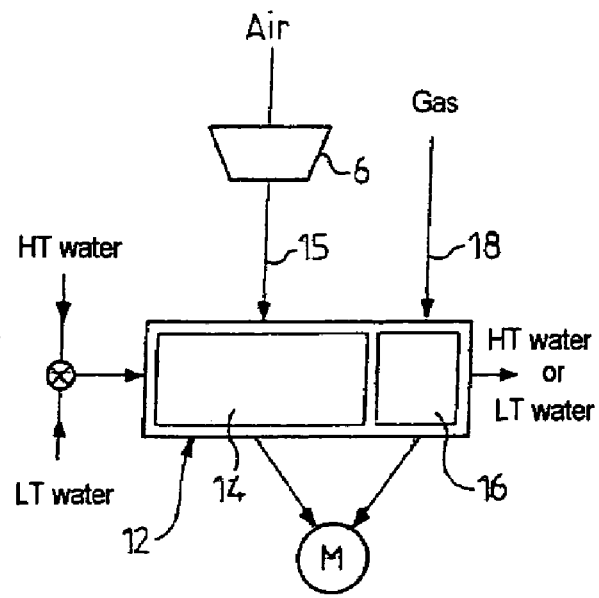
FIG. 2 is a schematic view of a heat exchanger according to the invention comprising two heat exchange sections.

FIG. 2 shows a single-stage heat exchanger 12, like the heat exchanger in FIG. 1, but comprising a first heat exchange section 14 through which the engine intake air 15 is intended to pass and a heat exchange section 16 through which the recycled exhaust gases are intended to pass. As in the preceding embodiment, the cooling liquid consists of the engine cooling water, this water being a water at low temperature (LT), at high temperature (HT), or a mixture of the two fluids, according to the position of the three-way valve 4. The heat exchange section 14 operates in an identical manner to the heat exchanger 2 shown in FIG. 1.

When the low temperature water circulates in the heat exchanger 12 and hence in the section 14, the engine supercharging air is heated after its compression in the compressor 6 and cooled before being sent to the engine. On the contrary, in order to heat the air entering the engine, for example in the vehicle starting phase, hot water is circulated in the heat exchanger 12. The recirculated exhaust gases enter the heat exchange section 16, as shown by the arrow 18. These gases, the temperature of which is high, up to 500° C., can be cooled by the high temperature water, the temperature of which is about 100° C.

It is also possible to cool the recirculation gases 18 with cold water in order to further enhance the cooling effect and to enhance the desired effect, which is to reduce the formation of nitrogen oxide.

In each of the cases discussed above, the cooling liquid, hot or cold, first crosses, in the example shown, the heat exchange section 14 with the air entering the engine, then the heat exchange section 16 for cooling the exhaust gases. This solution is preferred because it avoids excessively cooling the exhaust gases, which would be liable to foul the heat exchanger. However, a reverse order can also be considered, while remaining in series.

The exhaust gases must be cooled at low load. In this configuration, it is unnecessary to vigorously cool the engine supercharging air because the power required from the heat engine is low, the cooling of the supercharged air being particularly necessary in case of high load. In consequence, the single heat exchanger 12 can cool at least one of the two gases entering the heat engine, if not both, in case of medium load. After passing through the heat exchanger, the air 15 and the recirculation gases 18 are mixed to form a mixture M and be sent to the engine.

Figure 3:
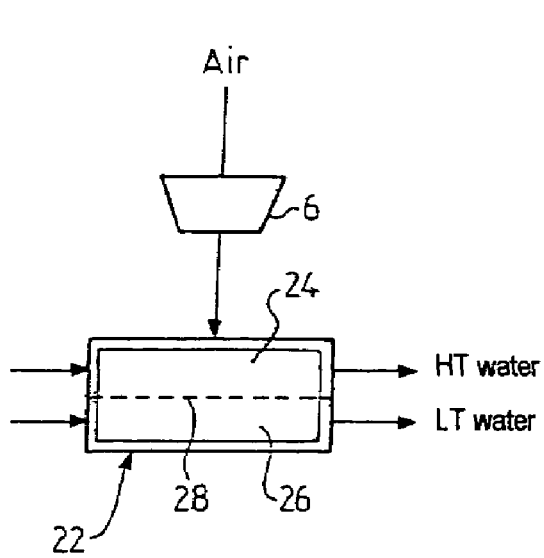
FIG. 3 is a schematic view of a heat exchanger according to the invention comprising a high temperature stage and a low temperature stage.

FIG. 3 shows an embodiment of a heat exchanger 22 comprising a high temperature stage 24 and a low temperature stage 26, designed to be crossed in succession by the engine intake air. In order to heat the engine intake air, above a certain outdoor ambient temperature, for example 0° C., or in the particulate filter regeneration phase, the cold water circulation is blocked in the low temperature stage 26 and the hot water circulation is activated in the high temperature stage 24. The heat exchanger 22 accordingly serves as an intake heater by means of its high temperature stage 24.

Conversely, when the heat exchanger 22 is used as a supercharging air cooler, the air from the turbocompressor 6 first passes through the high temperature stage 24, in other words the stage that is crossed by the hot water from the engine, and then the low temperature stage 26, in which the air which has already been cooled in passing through the first stage 24 is further cooled by cold water from a low temperature radiator. The low temperature stage 26 can also be used alone if the engine load is lower. The circulation of hot water and cold water in the high temperature and low temperature stages is controlled with the use of interconnecting means such as valves and pumps depending on the end purpose.

Figure 4:
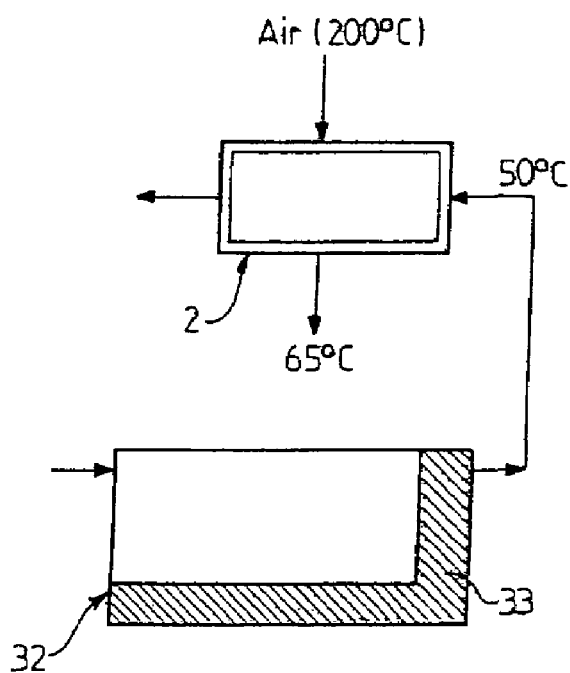
FIGS. 4 and 5 are two diagrams which illustrate a comparison between a single-stage cooler and a two-stage cooler.
Figure 5:
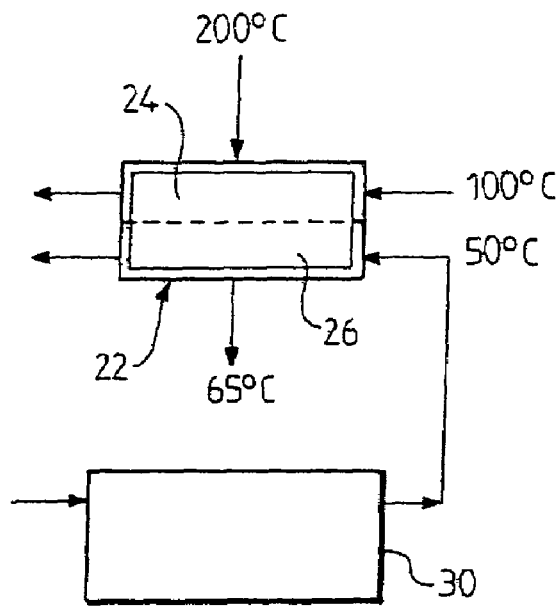

The two-stage heat exchanger 22 presents a better thermal efficiency than the single-stage heat exchanger 2. FIGS. 4 and 5 illustrate a comparison between these two types of heat exchanger. In both cases, the supercharging air to be cooled enters the heat exchanger at a temperature of 200° C. The temperature of the high-temperature water is assumed to be 100° C. and the temperature of the low temperature water is 50° C. In the case of the heat exchanger 22 (FIG. 5), a substantial portion of the thermal power is dissipated in the high temperature stage 24 by heat exchange with water at 100° C., and the outlet temperature level (65° C.) is sought on the low temperature stage 26. The low temperature radiator 30 therefore only has an auxiliary role. On the contrary, in the case of the single-stage heat exchanger 2 (FIG. 4), the entire thermal power is extracted by means of low temperature water (50° C.). In consequence, for the same supercharging air outlet temperature at the heat exchanger outlet (65° C.), the low temperature radiator 32 must have an additional heat exchange area, for example 25%, as shown by the area 33, which represents an extra cost.

Figure 6:
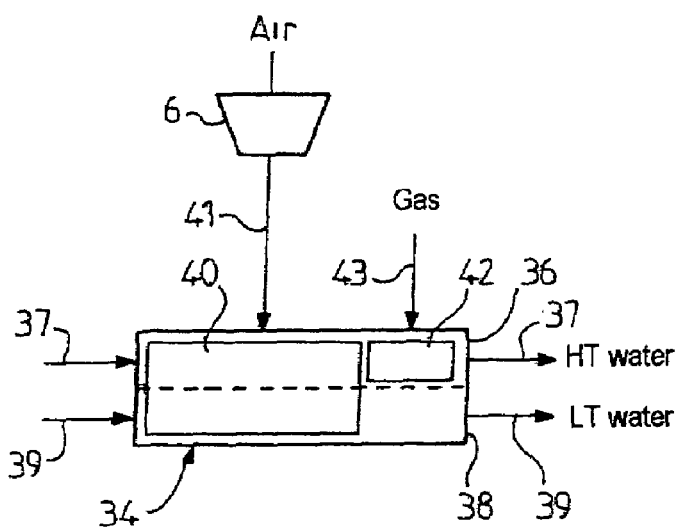
FIG. 6 is a schematic view of a heat exchanger according to the present invention comprising a high temperature stage and a low temperature stage, the high temperature stage comprising two heat exchange sections.

FIG. 6 shows a heat exchanger 34 comprising a high temperature stage 36 through which the high temperature water 37 passes, and a low temperature stage 38, through which the low temperature water 39 received, for example, from a low temperature radiator passes. The high temperature stage 36 comprises two heat exchange sections, that is a heat exchange section 40 through which the engine intake air 41 passes, and a heat exchange section 42 throught which the recirculated exhaust gases 43 passes, as indicated by the arrow 43. The heat exchange section 40, intended for the engine intake air, operates like the heat exchanger 22 in FIG. 3. The air entering the engine can first be cooled by the high temperature stage, and then by the low temperature stage. Or else, in an engine starting configuration, or particulate filter regeneration configuration, the air entering the engine can be heated by heat exchange with the high temperature water. The second heat exchange section 42, intended for the recirculated exhaust gases, comprises a single stage. The exhaust gases are cooled exclusively by heat exchange with the high temperature water, so as to contend with a potential problem of fouling of the heat exchanger 34.

Figure 7:
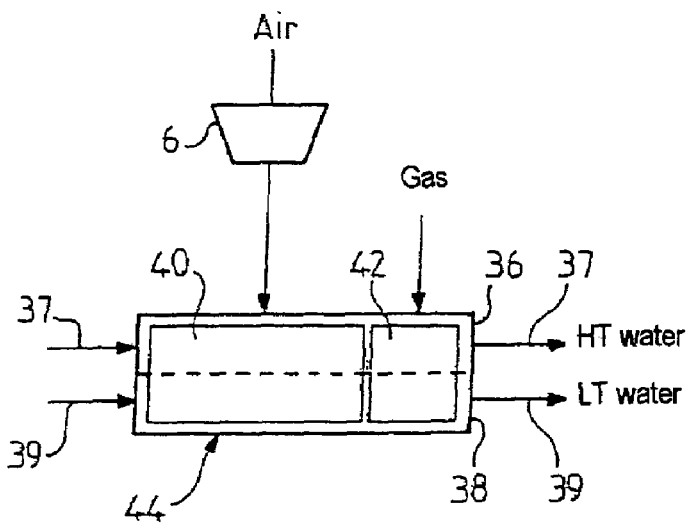
FIG. 7 shows a similar heat exchanger to the heat exchanger in FIG. 6, the low temperature stage further comprising a second heat exchange section.

The heat exchanger 44 shown in FIG. 7 is identical to the heat exchanger 34 shown in FIG. 6, except that the heat exchange section 42, intended to cool the exhaust gases, comprises a high temperature stage and a low temperature stage. The exhaust gases are therefore first cooled by heat exchange with the high temperature water, and then by heat exchange with the low temperature water. The cooling of the exhaust gases is thereby improved, contributing to further reducing the formation of nitrogen oxides.

Figure 8:
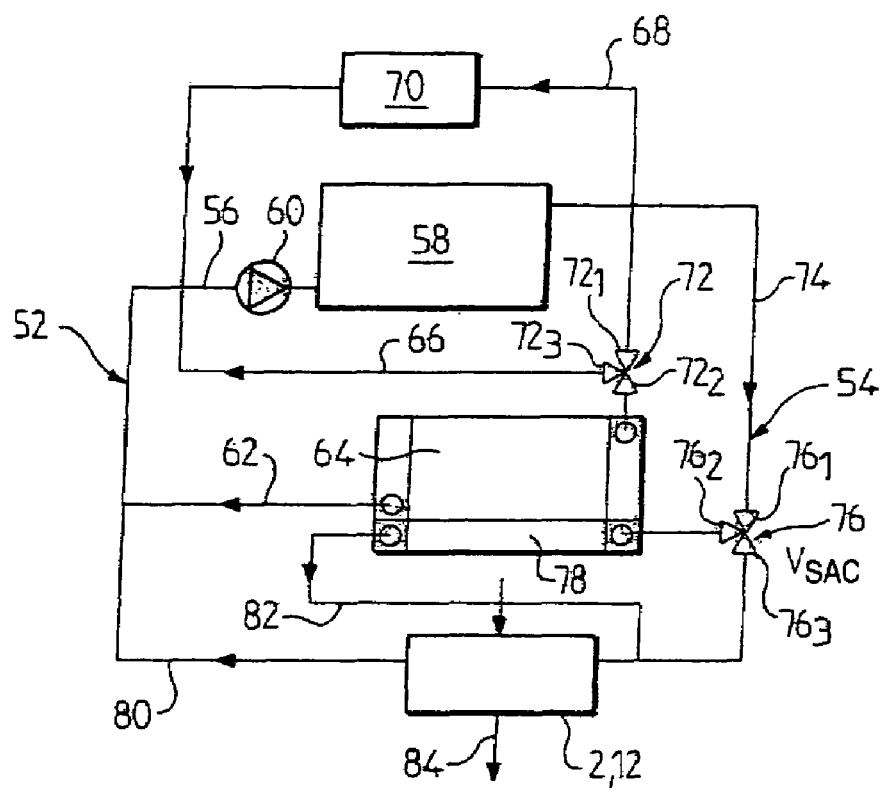
FIGS. 8 to 11 show four non-limiting embodiments of devices for managing the temperature of the gases entering a heat engine of an automotive vehicle according to the present invention.

FIG. 8 shows an overall view of a device for managing the temperature of the gases entering a heat engine of an automotive vehicle. This device comprises a main loop 52 and a secondary loop designated by the general reference numeral 54.

The main loop 52 comprises an engine line 56 connected to the heat engine 58 of the vehicle. A mechanical or electric pump 60 supplies the engine cooling circuit 58. The main loop 52 also comprises a radiator line 62 on which is mounted a main radiator 64 or high temperature radiator through which the engine cooling heat transfer fluid passes. A short-circuit line 66 is mounted in parallel with the radiator line 62.

The main loop further comprises a heating line 68 on which a unit heater 70 or vehicle passenger compartment heating radiator is mounted. A three-way regulation valve 72 with connections designated by the reference numerals $72_1$, $72_2$ and $73_3$, is used to circulate the cooling heat transfer fluid of the heat engine 58 either in the short-circuit line 66, or in the high temperature radiator 64. The regulation valve is sensitive to the temperature of the heat transfer liquid. Below a threshold temperature, for example 100° C., the regulation valve 72 circulates the heat transfer fluid via the short-circuit line 66. On the contrary, when the temperature of the heat transfer fluid exceeds this threshold value, the connection $72_3$ of the regulation valve 72 is closed, while the connections $72_1$ and $72_2$ are opened, so that the heat transfer fluid passes through the high temperature radiator 64 in order to be cooled.

The secondary loop 54 comprises a line 74 connected to the outlet of the heat engine cooling circuit. A supercharging air cooler valve ($V_{SAC}$) 76 is connected to the line 74. The valve 76 is a three-way valve with connections with reference numerals $76_1$, $76_2$ and $76_3$ respectively. The connection $76_2$ is connected to a low temperature radiator 78, while the connection $76_3$ is connected to a line 80. A heat exchanger according to the invention is inserted on the line 80. In the example shown, the heat exchanger is a single-stage heat exchanger like the heat exchangers 2 and 12 shown in FIGS. 1 and 2. A line 82 connects the outlet of the low temperature radiator to the inlet of the heat exchanger 2, 12.

The heat energy management device shown in FIG. 8 can operate either in an intake air heating configuration, or in a supercharging air cooling configuration. On starting the engine, it is necessary to heat the air intake. For this purpose, the connections $76_1$ and $76_3$ of the supercharging air cooler valve 76 are opened, while the connection $76_2$ is closed. The heat transfer fluid at high temperature leaving the engine 58 then passes through the heat exchanger 2, 12 so that the air entering the engine, indicated by the arrow 84, is heated. On the contrary, in order to cool the supercharging air, the connections $76_1$ and $76_2$ of the valve 76 are opened, while the connection $76_3$ is closed. The hot heat transfer fluid from the engine is then sent to the low temperature radiator 78 in which it is cooled. Via the line 82, it arrives upstream of the heat exchanger 2, 12. Thus a heat transfer fluid at low temperature passes through the heat exchanger, so that the air leaving the radiator, indicated by the arrow 84, is cooled.

Figure 9:
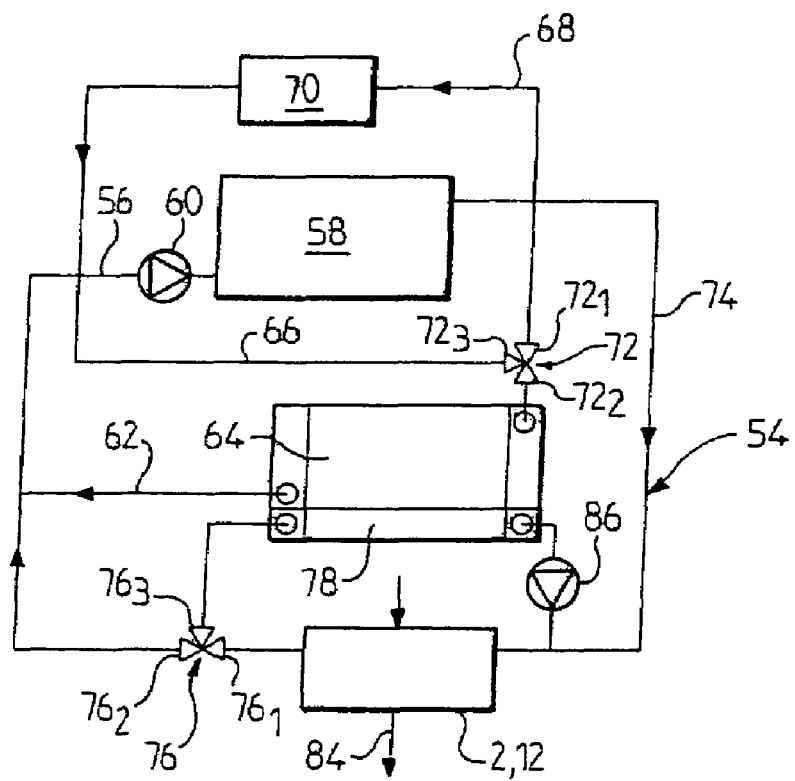

FIG. 9 shows a variant of the embodiment of the energy management device shown in FIG. 8. In this variant, the secondary loop 54 comprises a low temperature pump 86. The supercharging air cooling valve ($V_{SAC}$) 76 is placed at the outlet of the heat exchanger 2, 12. When the low temperature pump 86 is not in operation, the system operates, as described previously, as an intake air heater. The heat transfer fluid at high temperature leaving the heat engine 58 directly enters the heat exchanger 2, 12 and heats the air entering the heat exchanger, as indicated by the arrow 84. On the contrary, when the low temperature pump 86 is in operation, a branch connection is made to the high temperature circuit. The connections $76_1$ and $76_3$ of the valve 76 are open. The heat transfer fluid is cooled by circulation in the low temperature radiator. The cooling of the supercharging air 84 is thus achieved.

Figure 10:
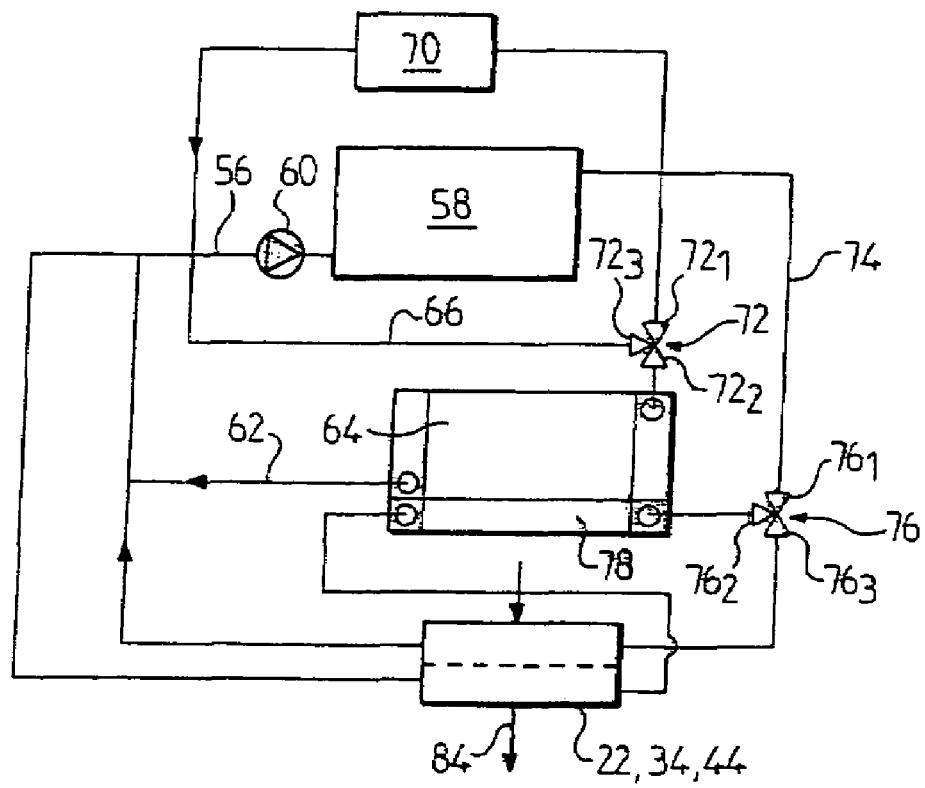

The device shown in FIG. 10 is identical to the one in FIG. 8, with the exception that the heat exchanger is a two-stage heat exchanger, with a high temperature stage and a low temperature stage respectively. This heat exchanger can therefore be the heat exchanger 22 in FIG. 3, the heat exchanger 34 in FIG. 6, or the heat exchanger 44 in FIG. 7. When the connections $76_1$, $76_2$, $76_3$ of the valve 76 are opened, the heat exchanger 22, 34, 44 operates as a two-stage supercharging air cooler. When the connections $76_1$ and $76_2$ are opened, while the connection $76_3$ is closed, the heat exchanger operates as a single-stage supercharging air cooler.

When the connections $76_1$ and $76_3$ are opened, the connection $76_2$ being closed, the heat exchanger operates as a supercharging air heater.

Figure 11:
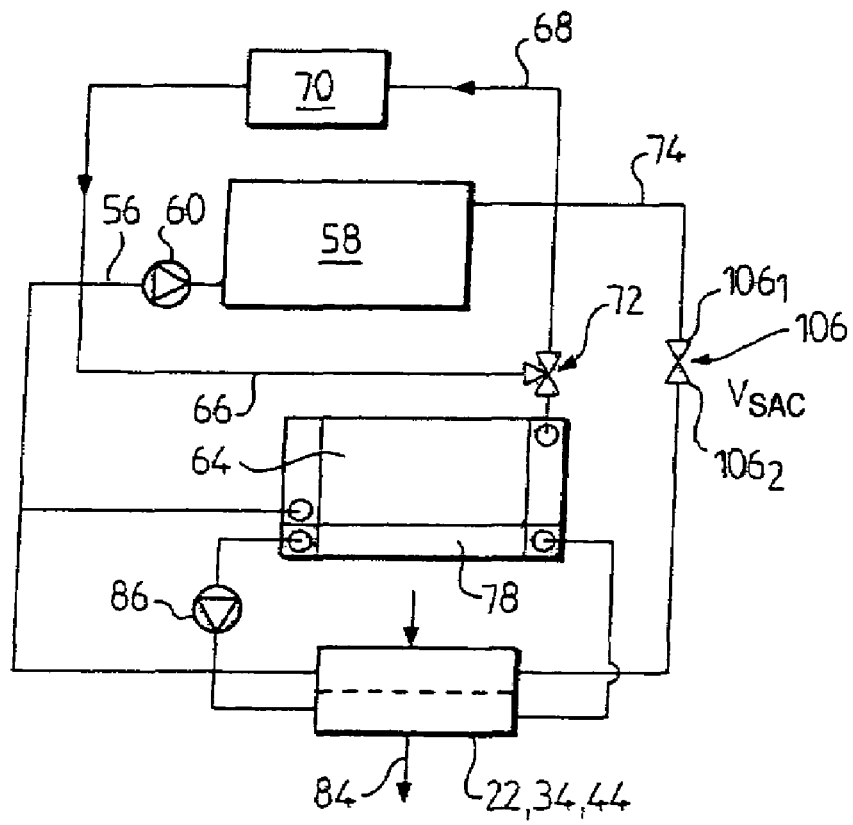

The management device shown in FIG. 11 is identical to the one in FIG. 9, with the exception that the heat exchanger is a two-stage heat exchanger of the type shown in FIGS. 3, 6 and 7. The line 74 from the outlet of the internal combustion engine 58 passes directly through the high temperature stage. A low temperature circulation loop passing through the low temperature radiator 78 is set in circulation by the low temperature pump 86. The low temperature fluid passes through the low temperature stage of the heat exchanger 22, 34, 44.

The supercharging air cooler valve 106 is a two-way valve only, the connections having the reference numerals $106_1$ and $106_2$, respectively. When the connections 1 and 2 of the valve 106 are opened, and the low temperature pump 86 is not in operation, the hot heat transfer fluid leaving the engine 58 passes directly through the high temperature stage and the air entering the engine is heated (engine starting period). When the low temperature pump 86 is actuated, in the same configuration of the valve 106, a two-stage cooling of the supercharging air is achieved. When the valve 106 is closed, the pump 86 being in operation, this produces a single-stage supercharging air cooler.

When the heat exchanger has two stages, it is necessary to limit the thermal bridge between the high temperature stage and the low temperature stage. This is achieved by removing material from the common fins of the two stages or by an equivalent method shown by the broken line 28 in FIG. 3.

The invention claimed is:

1. A method for controlling the temperature of the gases entering an internal combustion engine (58), comprising:
   1) circulating the gases in a liquid/gas heat exchanger (2, 12, 22, 34, 44) prior to entering the internal combustion heat engine (58);
   2) circulating a high temperature liquid through the liquid/gas heat exchanger, said high temperature liquid coming from a main loop (52), the main loop (52) comprising the internal combustion engine (58) and a high temperature radiator (64); and
   3) circulating a low temperature liquid through the liquid/gas heat exchanger, said low temperature liquid coming from a secondary loop (54) in order to heat and/or cool the gases, said secondary loop comprising a low temperature radiator (78);
   wherein the heat exchanger includes a single stage heat exchanger (2, 12) and the method further comprises the step of circulating either a low temperature liquid, a high temperature liquid or a mixture of the low temperature liquid and the high temperature liquid through the single state heat exchanger (2, 12); and
   wherein the single stage heat exchanger (2, 12) includes two sections (14, 16) and the method further comprises the step of passing engine intake air (15) through one section (14) and a re-circulated fraction of exhaust gas (18) through the other section (16).

2. A method of controlling the temperature of gases entering a heat engine (58) having a fluid inlet and a fluid outlet, the method comprising the steps of:
   circulating a fluid through a main loop (52), the main loop (52) comprising the heat engine (58), a main radiator (64) in fluid communication with the fluid outlet of the heat engine (58), a three way regulation valve (72) controlling fluid flow between the heat engine (58) and the main radiator (64), a short circuit line (66) interconnecting the three way regulation valve (72) and the fluid inlet of the heat engine (58), and a radiator line (62) interconnecting the main radiator (64) and the fluid inlet of the heat engine (58);
   circulating the fluid through a secondary loop (54), the secondary loop comprising the heat engine (58), a low temperature radiator (78) in fluid communication with the fluid outlet of the heat engine (58), a three way super charging air cooler valve (76), a single stage heat exchanger (2, 12) in fluid communication with both the low temperature radiator (78) and the air cooler valve (76), and a line (80) interconnecting the single stage heat exchanger (2, 12) and the heat engine (58), the air cooler valve (76) including a first connection ($76_1$) interconnecting the air cooler valve (76) and the fluid outlet of the heat engine (58), a second connection ($76_2$) interconnecting the air cooler valve (76) and the low temperature radiator (78), and a third connection ($76_3$) interconnecting the air cooler valve (76) and the single stage heat exchanger (2, 12);
   passing a flow of gases (84) through the single stage heat exchanger (2, 12) to heat or cool the flow of gases prior to the flow of gases entering the heat engine (58); and
   operating the air cooler valve (76) to heat or cool the flow of gases by closing the third connection ($76_3$) of the air cooler valve (76) to prevent direct fluid flow between the air cooler valve (76) and the single stage heat exchanger (2, 12) and opening the first connection ($76_1$) and the second connection ($76_2$) of the air cooler valve (76) to direct the fluid through the low temperature radiator (78) prior to flowing through the single stage heat exchanger (2, 12) to cool the flow of gases, or closing the second connection ($76_2$) of the air cooler valve (76) to prevent fluid flow through the low temperature radiator (78) and opening the first connection ($76_1$) and the third connection ($76_3$) of the air cooler valve (76) to direct the fluid directly from the air cooler valve (76) to the single stage heat exchanger (2, 12) to heat the flow of gases.

3. A system for managing a temperature of a flow of gases, the system comprising:
   a main fluid loop (52) including:
      a heat engine (58) having a fluid inlet and a fluid outlet;
      a main radiator (64) in fluid communication with the fluid outlet of the heat engine (58);
      a three way regulation valve (72) for controlling a fluid flow between the heat engine (58) and the main radiator (64);
      a short circuit line (66) interconnecting the three way regulation valve (72) and the fluid inlet of the heat engine (58), wherein the three way regulation valve (72) includes a first connection ($72_1$) interconnecting the three way regulation valve (72) and the fluid outlet of the heat engine (58), a second connection ($72_2$) interconnecting the three way regulation valve (72) and the main radiator (64), and a third connection ($72_3$) interconnecting the three way regulation valve (72) and the short circuit line (66);
   a secondary fluid loop (54) including:
      the heat engine (58);
      a low temperature radiator (78) in fluid communication with the fluid outlet of the heat engine (58);
      a single stage heat exchanger (2, 12) in fluid communication with the fluid outlet of the heat engine (58), the low temperature radiator (78), and the fluid inlet of the heat engine (58); and
      a three stage air cooler valve (76) for controlling fluid flow to the low temperature radiator (78) and the single stage heat exchanger (2, 12), the air cooler valve (76) having a first connection (76₁) interconnecting the air cooler valve (76) and the fluid outlet of the heat engine (58), a second connection (76₂) interconnecting the air cooler valve (76) and the low temperature radiator (78), and a third connection (76₃) interconnecting the air cooler valve (76) and the single stage heat exchanger (2, 12);

wherein the air cooler valve (76) is operable to control fluid flow through the low temperature radiator (78) and the single stage heat exchanger (2, 12) to heat or cool a flow of gases (84) passing through the single stage heat exchanger (2, 12) prior to entering the heat engine (58) by opening the first connection (76₁) and the second connection (76₂) of the air cooler valve (76) to fluid flow and closing the third connection (76₃) of the air cooler valve (76) to fluid flow to direct a flow of fluid through the low temperature radiator (78) and then through the single stage heat exchanger (2, 12) to cool the flow of gases, or by closing the second connection (76₂) of the air cooler valve (76) to fluid flow and opening the first connection (76₁) and the third connection (76₃) of the air cooler valve (76) to fluid flow to direct the flow of the fluid directly from the air cooler valve (76) to the single stage heat exchanger (2, 12) to heat the flow of gases.

* * * * *

UNITED STATES PATENT AND TRADEMARK OFFICE
CERTIFICATE OF CORRECTION

PATENT NO. : 7,717,097 B2  Page 1 of 1
APPLICATION NO. : 11/450519
DATED : May 18, 2010
INVENTOR(S) : Guerrero It is certified that error appears in the above-identified patent and that said Letters Patent is hereby corrected as shown below:

Title page, item [30] after "Related U.S. Application Data Continuation of application No. 10/500,939, filed on Jul. 8, 2004, now abandoned." insert heading --Foreign Application Priority Data-- and immediately after, insert --Feb. 12, 2002 (FR) 02 01715--

Signed and Sealed this

Thirty-first Day of August, 2010

David J. Kappos
*Director of the United States Patent and Trademark Office*